US010894373B2

(12) United States Patent
Scrivani (10) Patent No.: US 10,894,373 B2
(45) Date of Patent: Jan. 19, 2021

(54) HERMETIC SEALING DEVICE FOR PACKAGES CONTAINING FOOD PRODUCTS

(71) Applicant: AZIONARIA COSTRUZIONI MACCHINE AUTOMATICHE A.C.M.A. S.p.A., Bologna (IT)

(72) Inventor: Massimo Scrivani, Casteggio (IT)

(73) Assignee: AZIONARIA COSTRUZIONI MACCHINE AUTOMATICHE A.C.M.A. S.p.A., Bologna (IT)

( * ) Notice: Subject to any disclaimer, the term of this patent is extended or adjusted under 35 U.S.C. 154(b) by 105 days.

(21) Appl. No.: 16/315,030

(22) PCT Filed: Jul. 11, 2017

(86) PCT No.: PCT/IB2017/054182
§ 371 (c)(1),
(2) Date: Jan. 3, 2019

(87) PCT Pub. No.: WO2018/011715
PCT Pub. Date: Jan. 18, 2018

(65) Prior Publication Data
US 2020/0180234 A1   Jun. 11, 2020

(30) Foreign Application Priority Data

Jul. 11, 2016  (IT) .................. 102016000071546

(51) Int. Cl.
*B29C 65/18*   (2006.01)
*B29C 65/00*   (2006.01)
(Continued)

(52) U.S. Cl.
CPC ........ *B29C 66/1122* (2013.01); *B29C 66/849* (2013.01); *B29C 65/18* (2013.01);
(Continued)

(58) Field of Classification Search
CPC ... B29C 66/1122; B29C 66/849; B29C 65/18; B29C 65/53461; B65B 11/50
(Continued)

(56) References Cited

U.S. PATENT DOCUMENTS 2,961,031 A * 11/1960 Fener .................... B29C 65/222
156/515
3,337,716 A   8/1967 Nittel
(Continued)

FOREIGN PATENT DOCUMENTS

CN   101910003 A   12/2010
CN   202400326 U   8/2012
(Continued)

OTHER PUBLICATIONS

International Search Report and Written Opinion dated Sep. 7, 2017 from counterpart PCT App PCT/IB2017/054182.
Chinese Office Action dated May 7, 2020 from counterpart Chinese Patent Application No. 101780043215.3.

*Primary Examiner* — Chelsea E Stinson
*Assistant Examiner* — Mary C Hibbert-Copeland
(74) *Attorney, Agent, or Firm* — Shuttleworth & Ingersoll, PLC; Timothy J. Klima (57) ABSTRACT

The sealing device, forming the object of this invention, for packages containing food products, includes a unit for gripping and/or feeding a piece of thin flexible material forming a film used to cover and at least partly seal the food product; a sealing element which includes a rheostat having an annular body and two terminals extending from the annular body and connectable to a voltage generator capable of generating and maintaining an electrical potential difference at the ends of the two terminals in such a way as to cause to flow along the rheostat an electric current capable of heating the annular body to a predetermined sealing temperature. Each terminal has at the point of its connection
(Continued)

to the annular body of the rheostat a cross section whose surface area is the smallest compared to the cross sections at all other points of the terminal.

5 Claims, 12 Drawing Sheets

(51) Int. Cl.
    *B29L 31/00*     (2006.01)
    *B65B 7/28*     (2006.01)
    *B65B 51/14*     (2006.01)

(52) U.S. Cl.
    CPC ... *B29C 66/53461* (2013.01); *B29L 2031/712* (2013.01); *B65B 7/2878* (2013.01); *B65B 51/14* (2013.01)

(58) Field of Classification Search
    USPC ............................................. 53/451
    See application file for complete search history.

(56) References Cited

U.S. PATENT DOCUMENTS

| | | |
|---|---|---|
| 3,369,954 A | 2/1968 | Alfred et al. |
| 3,425,887 A | 2/1969 | Bowen et al. |
| 4,078,360 A * | 3/1978 | Balzer ................... B29C 66/112 53/76 |
| 2004/0206048 A1 | 10/2004 | Iuchi et al. |

FOREIGN PATENT DOCUMENTS

| | | | |
|---|---|---|---|
| DE | 1886977 U | 2/1964 | |
| DE | 3344561 A1 * | 6/1985 | ............ B29C 65/18 |
| DE | 3344561 A1 | 6/1985 | |
| EP | 2492201 A1 | 8/2012 | |
| IT | BO2013A000390 | 7/2013 | |
| WO | WO8002271 A1 | 10/1980 | |
| WO | WO2009084045 A1 | 7/2009 | |
| WO | WO2015011657 A1 | 1/2015 | |
| WO | WO2015121838 A2 | 8/2015 | |

* cited by examiner

HERMETIC SEALING DEVICE FOR PACKAGES CONTAINING FOOD PRODUCTS

This application is the National Phase of International Application PCT/I62017/054182 filed Jul. 11, 2017 which designated the U.S.

This application claims priority to Italian Patent Application No. 102016000071546 filed Jul. 11, 2016, which application is incorporated by reference herein.

TECHNICAL FIELD

This invention relates to a hermetic sealing device for packages which contain food products.

The terms used in this disclosure to describe and claim the invention have the following meanings:

Package means: wrapper envelope; container; capsule.

Covering and sealing element means lid; covering; cover to seal; covering and sealing film.

The term "food products" is used to mean sweets, chocolates, bonbons, snacks, pods and capsules for coffee or to contain products for infusion.

BACKGROUND ART

The capsules used for the preparation of infusions are of the single-use type and usually comprise a container used to hold a portion of an aromatic substance and provided with a perforatable lid through which water can be fed, and a bottom through which is dispensed the beverage produced by effect of the infusion of the water with the aromatic substance present in the container.

Prior art packaging machines for making capsules comprise, very briefly, a conveying line for moving the containers along a predetermined path in a feed direction.

In a first station along the feed path is located a system, where provided, for feeding a continuous web of sheet material which is located at least partly above the container conveying line and from which capsule bottom linings are cut and inserted into the containers.

In this station, each bottom lining is cut from the web, fed downwardly and inserted into the respective container. Where provided, in the same station, the bottom lining is sealed to the container.

Next, in a filling station, the containers are filled with a suitably measured quantity of the aromatic substance.

Downstream of the filling station along the feed direction, prior art machines comprise a station for closing the capsules where a lid is applied to each container.

In substantially the same way as with the bottom linings, the closing station is normally provided with a system for feeding a continuous web of film, which is located at least partly above the container conveying line and from which the lids are cut and applied to the mouth at the top of each container.

Each lid is cut from the web, fed downwardly and applied and sealed to the respective container.

Generally speaking, to apply both the lids and, if provided, the bottom linings, the above mentioned operations are performed by actuator means which are equipped with knives for cutting the lids or the bottom linings, with pickup elements for holding the lids or the bottom linings and, if necessary, with sealers. The actuator means, spaced at the same spacing as the containers being processed, each basically comprise a rod movable between a raised position and a lowered position for applying/positioning the bottom lining or the lid in or on the container. At a position intermediate between the end positions, as mentioned, the bottom lining or the lid is cut from the respective continuous web.

An example of a machine for making capsules is described in patent application BO2013A000390 in the name of the same Applicant as this application.

That machine comprises cutting stations and sealing stations. There are also transfer means operating between the cutting stations and the sealing stations to transfer the pieces of web that will form the capsule lids.

Packages for food products may also include wrappers for food items such as chocolates, sweets and the like.

The Applicant has found that the machine is low in efficiency owing to the fact that the pieces of web have to be transferred from the cutting station to the sealing station and that the sealing stations are low in efficiency in that they are based on heat generated by the Joule effect. In effect, a first drawback of prior art sealing stations is that the sealing temperature is not constant over the entire sealing surface. Another drawback is due to the impossibility of combining the need to operate at high sealing temperatures while at the same time limiting leakages. In effect, while on the one hand raising the operating current allows increasing the sealing temperature, on the other, circuit leakages are directly proportional to the square of the very same operating current.

DISCLOSURE OF THE INVENTION

In this context, the main technical purpose of this invention is to overcome the above mentioned disadvantages.

One aim of this invention is to propose a device for sealing food product packages, such as capsules or pods containing aromatic substances for infusions, which is at once efficient and capable of reconciling the opposite needs to optimize both sealing and electrical efficiency.

Another aim of this invention is to propose a device for sealing capsules or pods containing aromatic substances for infusions, which is compact and capable of improving the efficiency of the machine as a whole.

Another aim of this invention is to propose a device for hermetically sealing sweets, chocolates and the like.

The technical purpose and aims specified are substantially achieved by a device for sealing capsules containing aromatic substance for infusions comprising the technical features disclosed herein.

BRIEF DESCRIPTION OF DRAWINGS

Further features of the invention and its advantages are more apparent in the non-limiting description below, with reference to a preferred but non-exclusive embodiment of a sealing device as illustrated in the accompanying drawings, in which.

DETAILED DESCRIPTION OF PREFERRED EMBODIMENTS OF THE INVENTION

Figure 1:
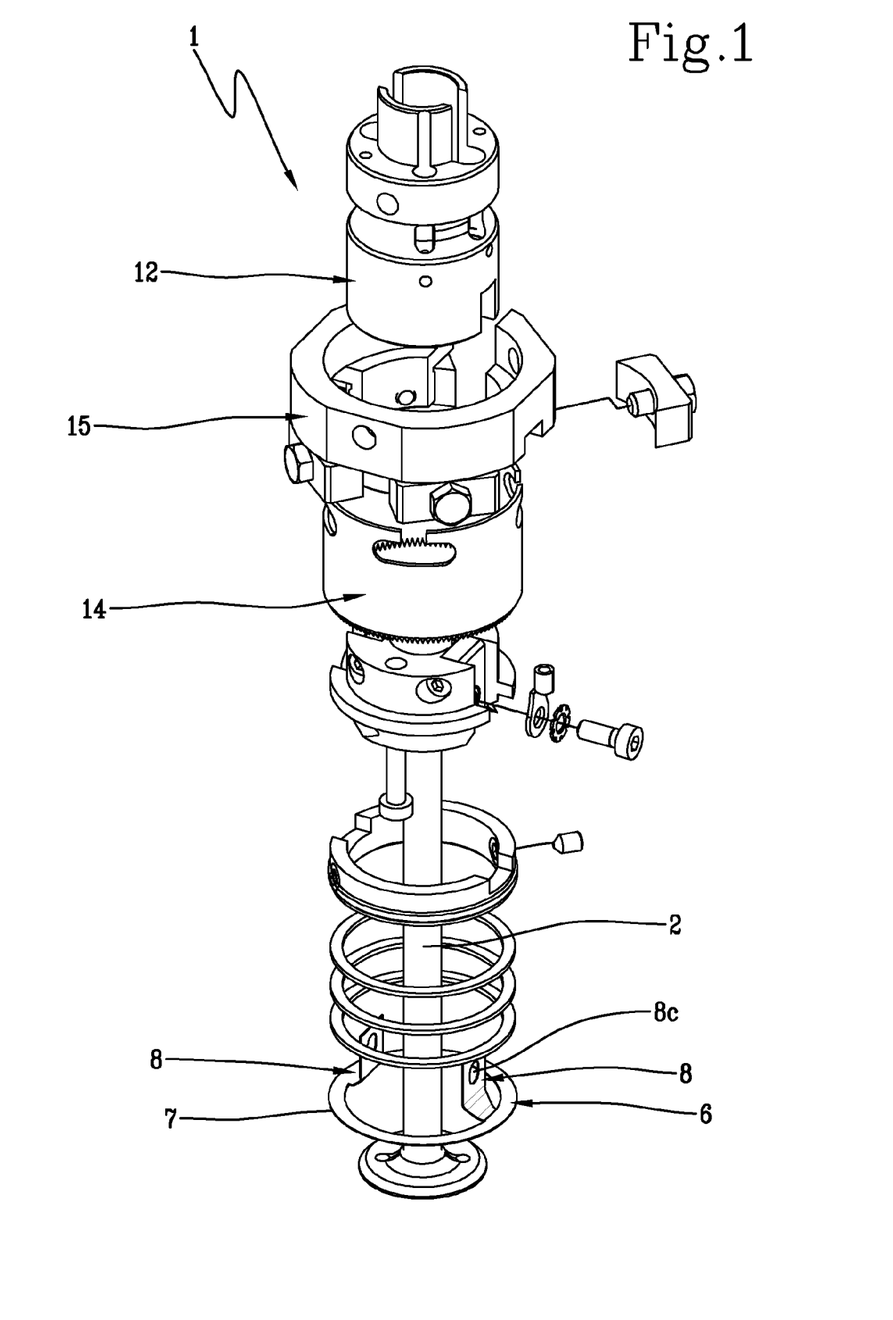
FIG. 1 is an exploded perspective view of a device according to this invention for hermetically sealing packages which contain food products.
Figure 2:
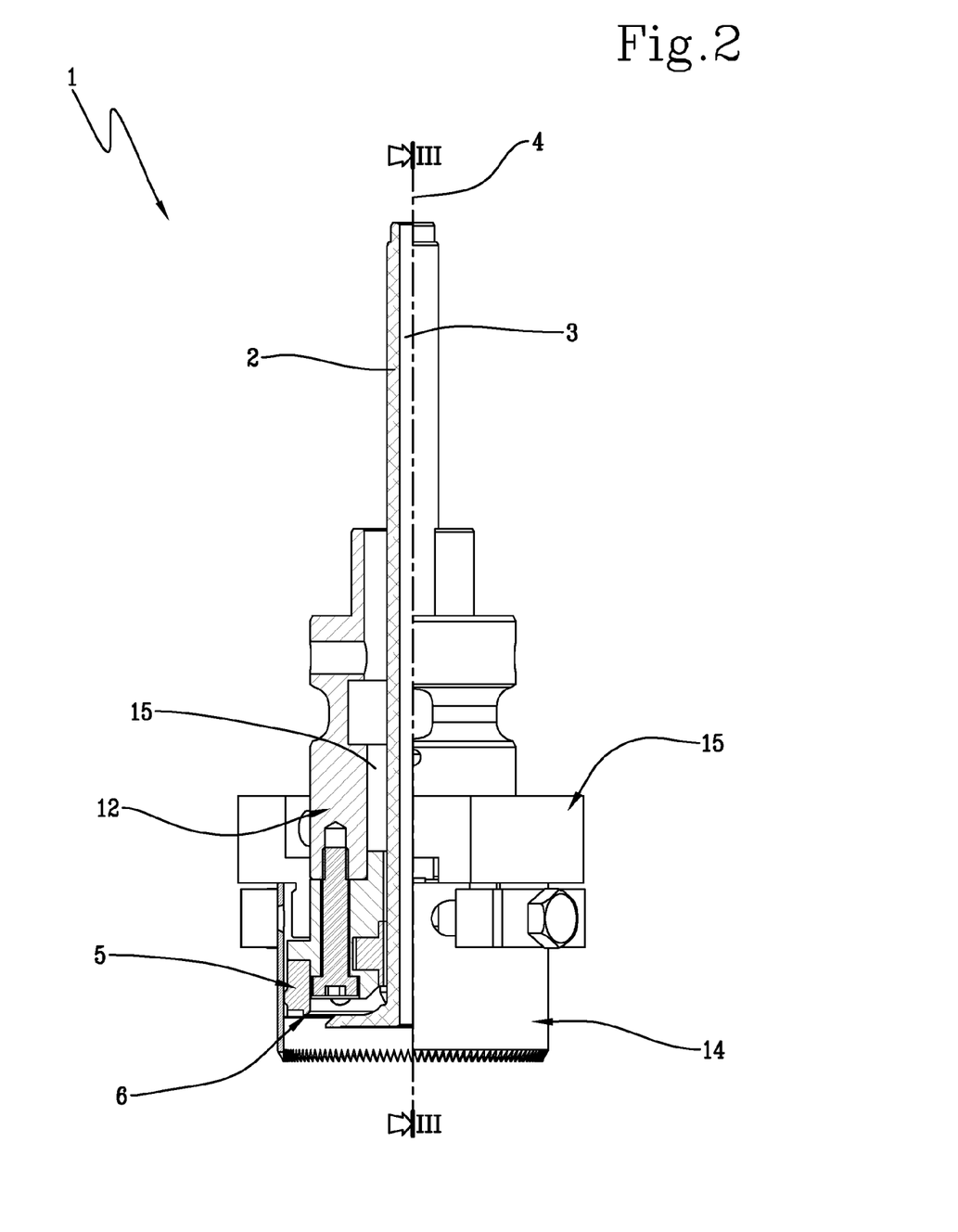
FIG. 2 shows the sealing device of FIG. 1, when assembled, in a schematic front view and partly in cross section.
Figure 3:
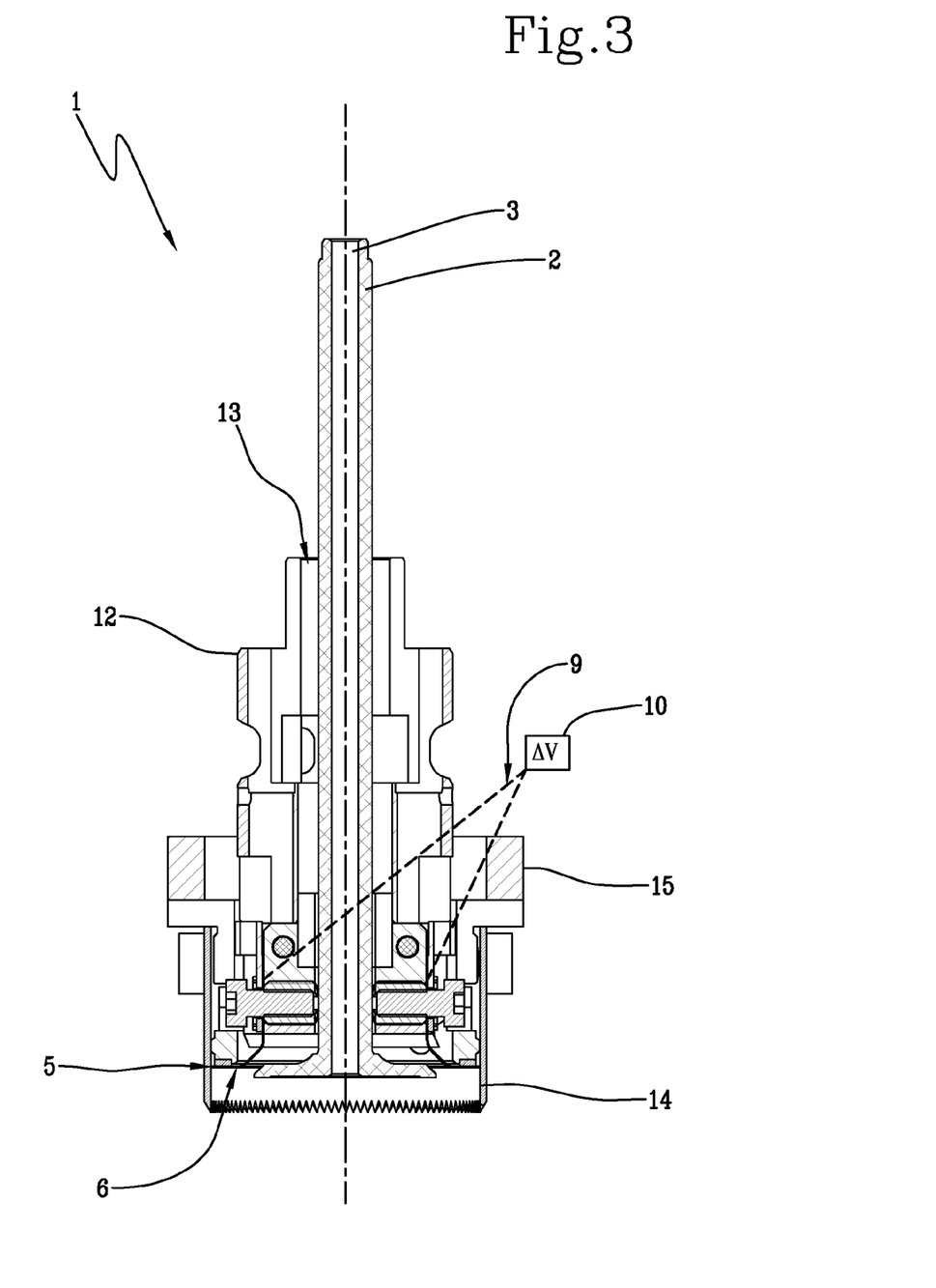
FIG. 3 shows the cross section through line III-III of FIG. 2.
Figures 4, 5, 6, 7:
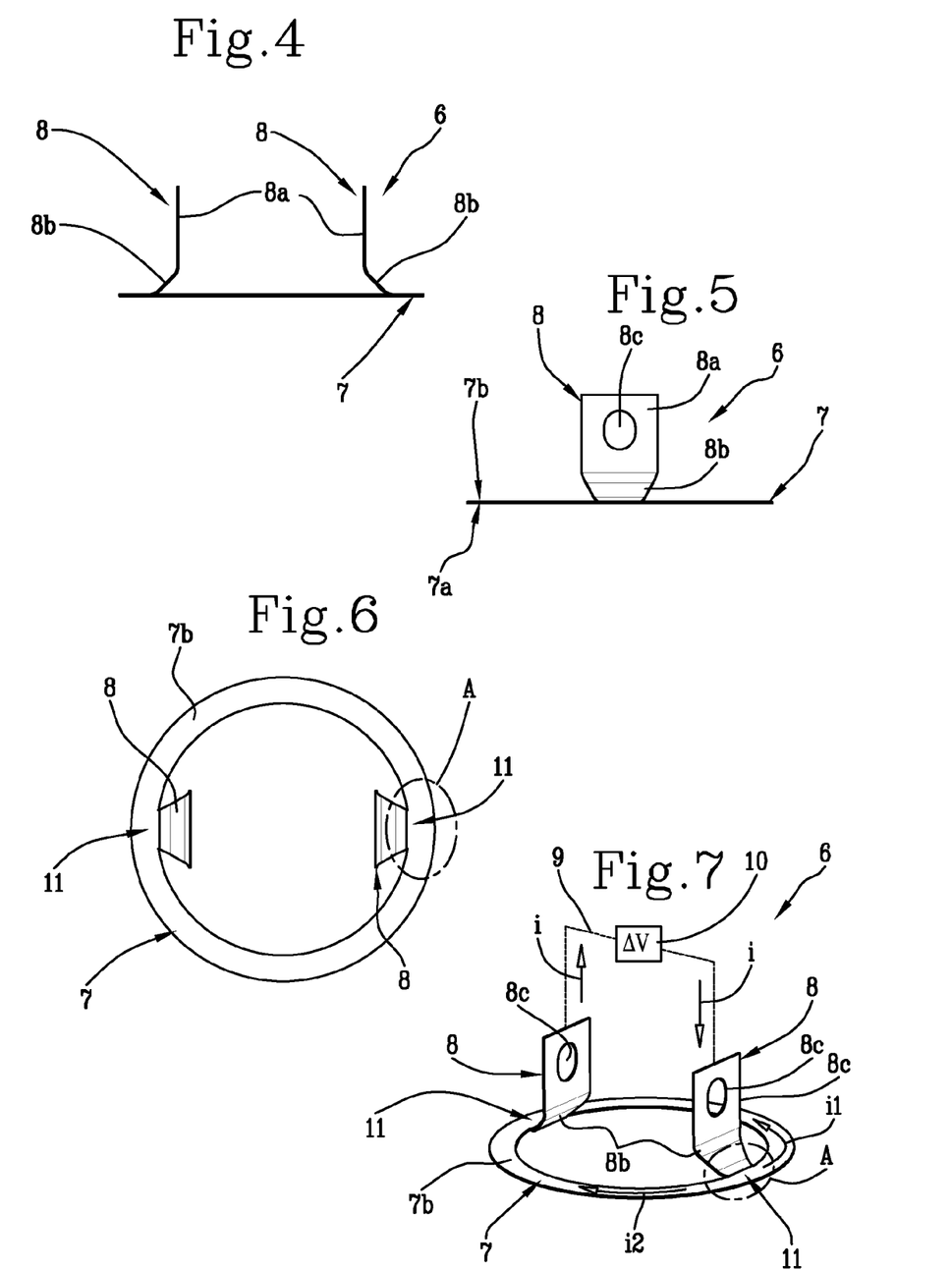
FIGS. 4-7 illustrate a rheostat of the sealing device of FIG. 1 in schematic side, front, top and perspective views, respectively.

With reference to FIGS. 1-3, the numeral 1 denotes a device according to this invention for sealing capsules 100 containing aromatic substances for infusions.

Figure 13:
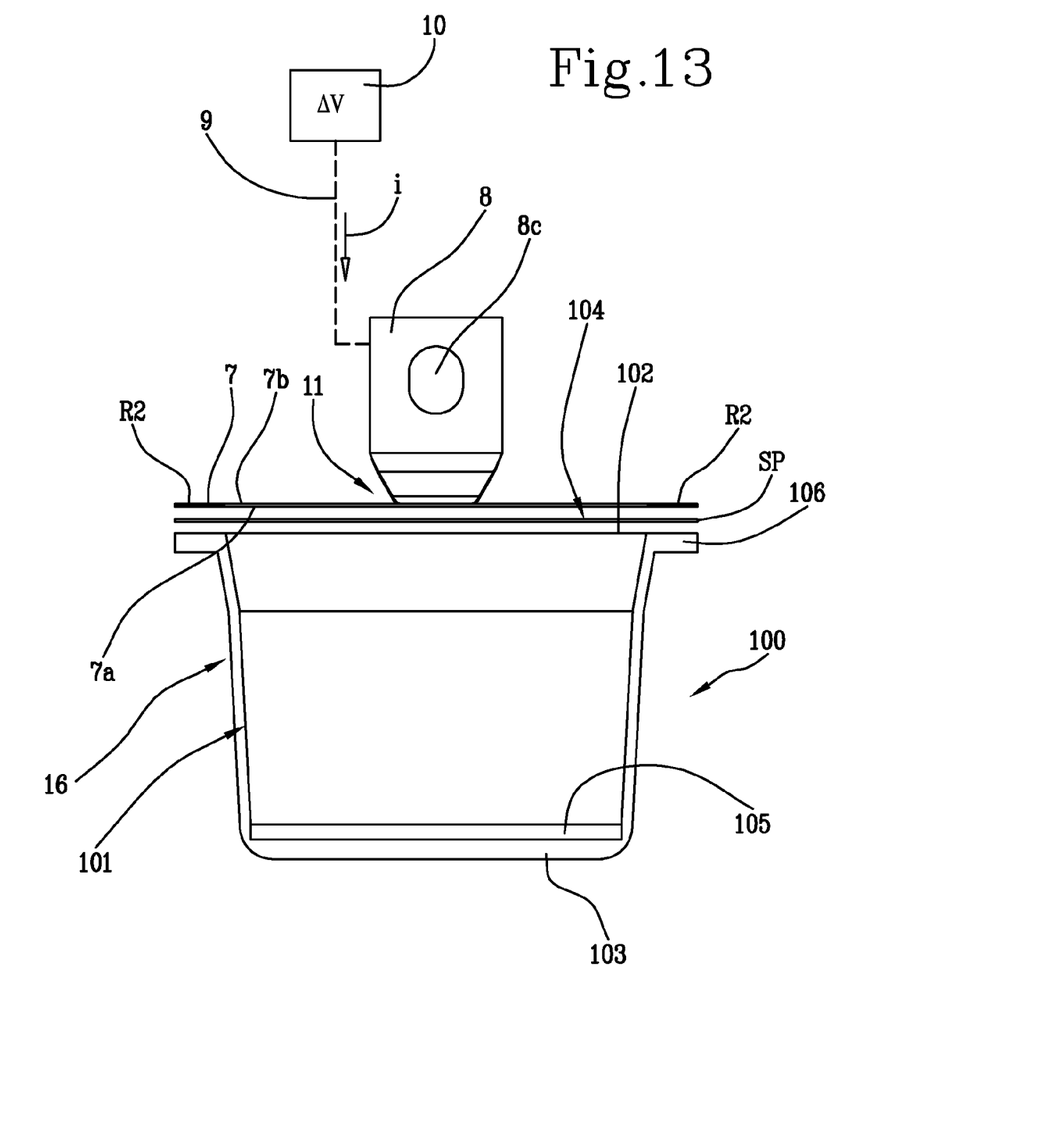
FIG. 13 illustrates a detail from FIG. 12 in an enlarged, schematic view.
Figure 14:
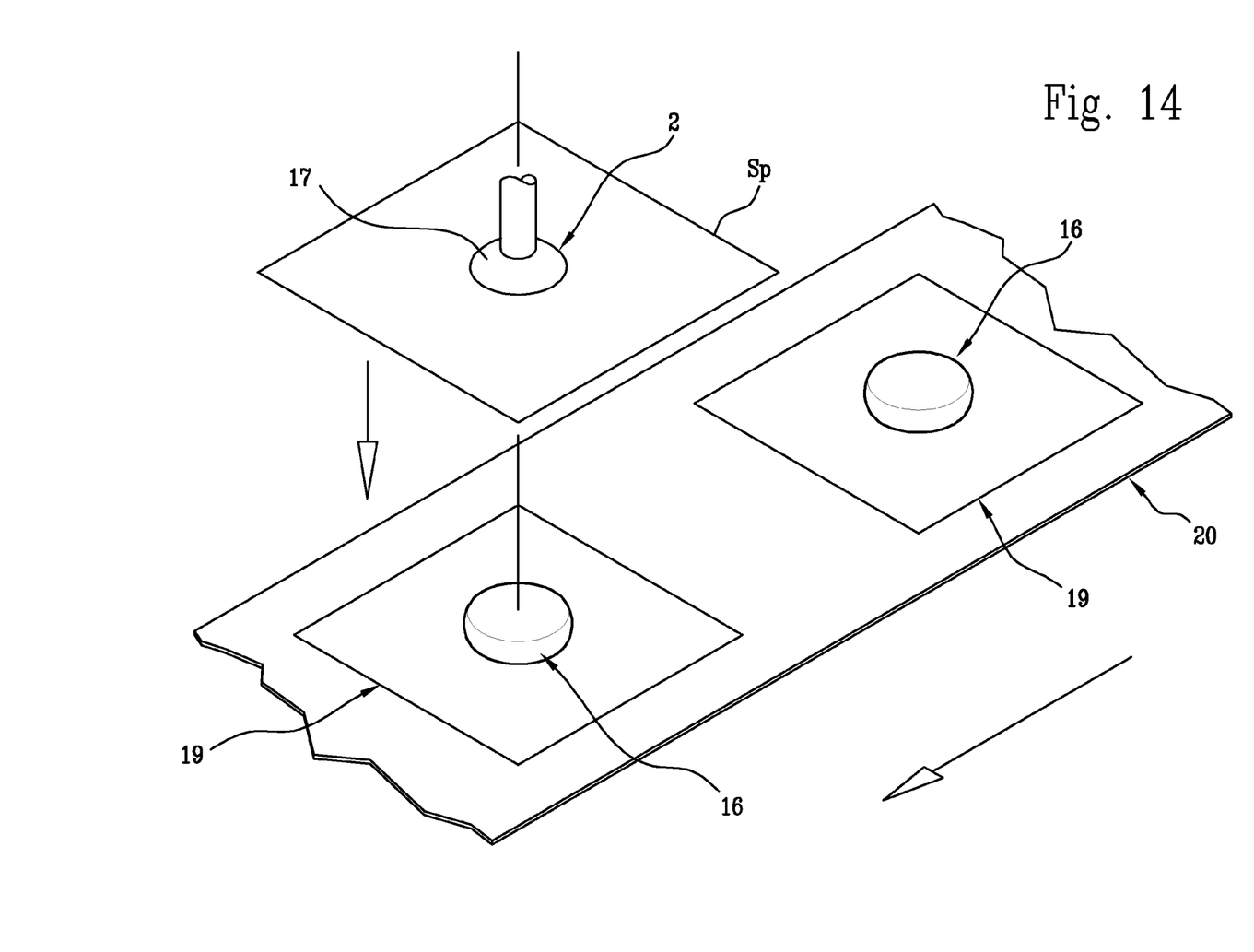
FIGS. 14-18 illustrate a device according to this invention for hermetically sealing packages which contain food products, in particular sweets, chocolates and similar products.
Figure 15:
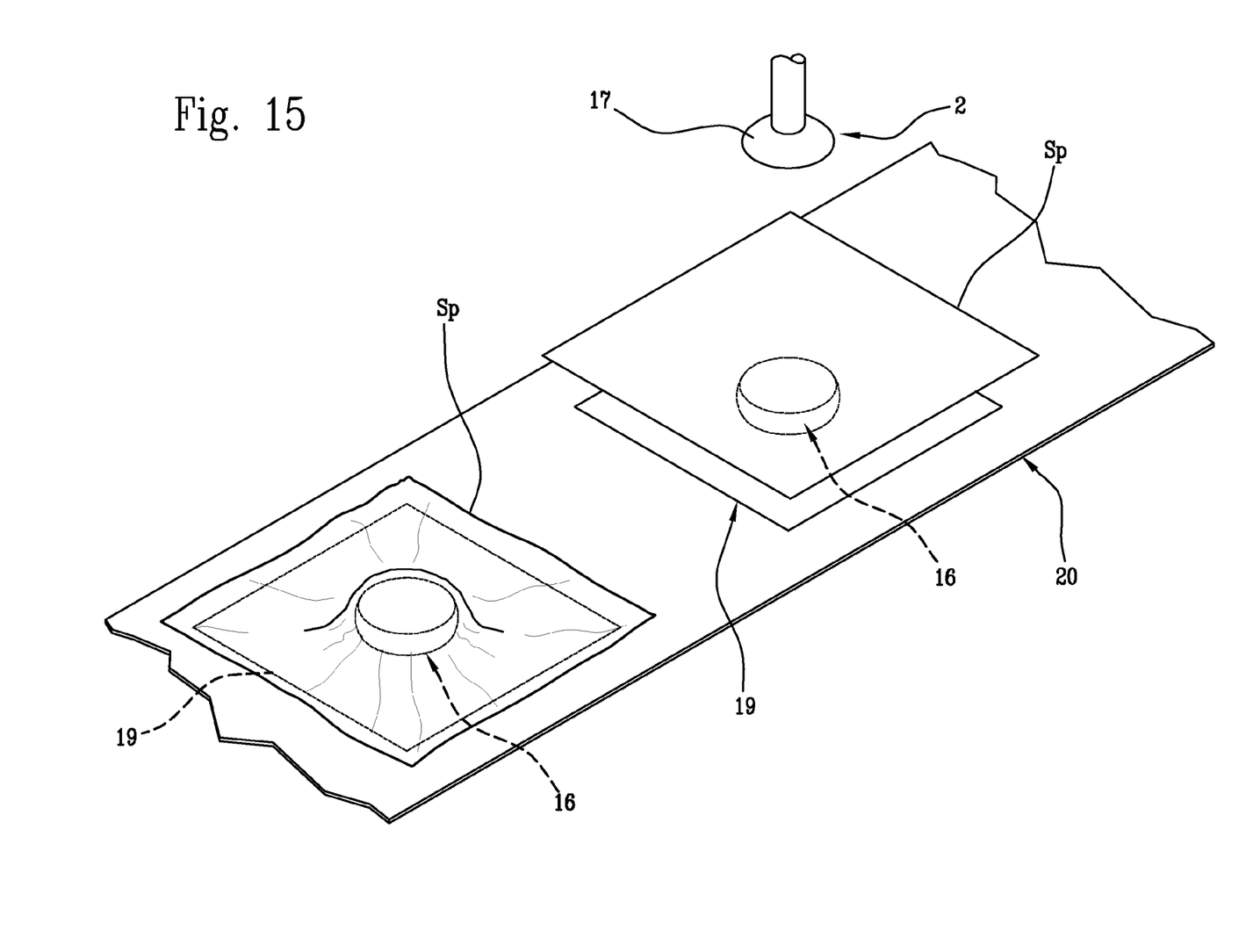
Figure 16:
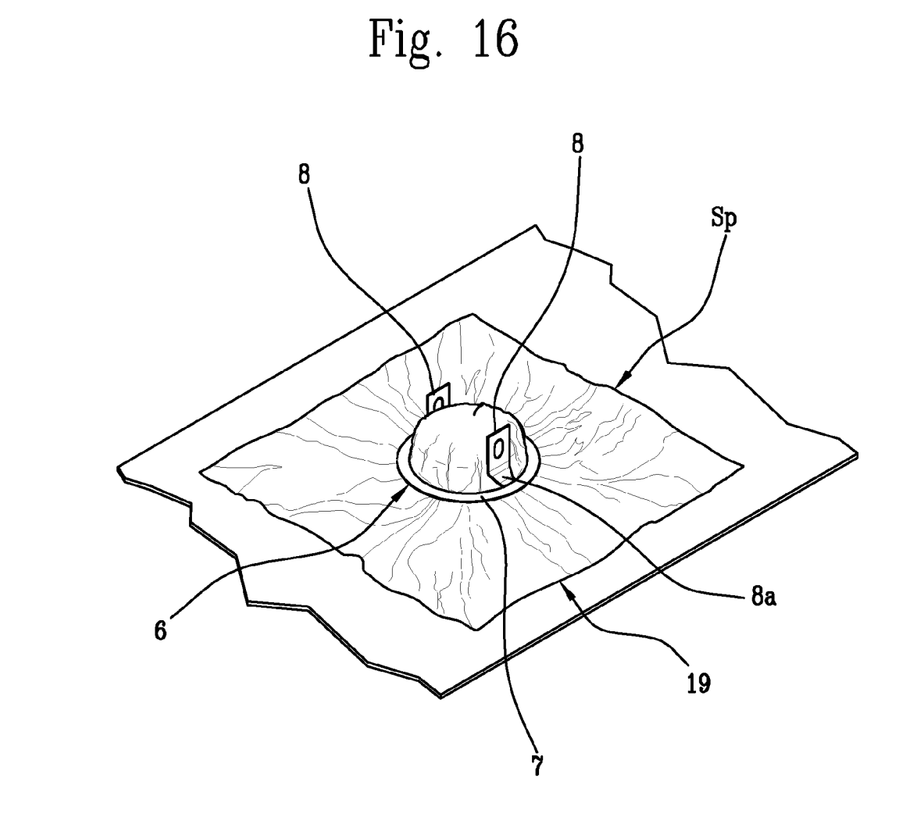
Figure 17:
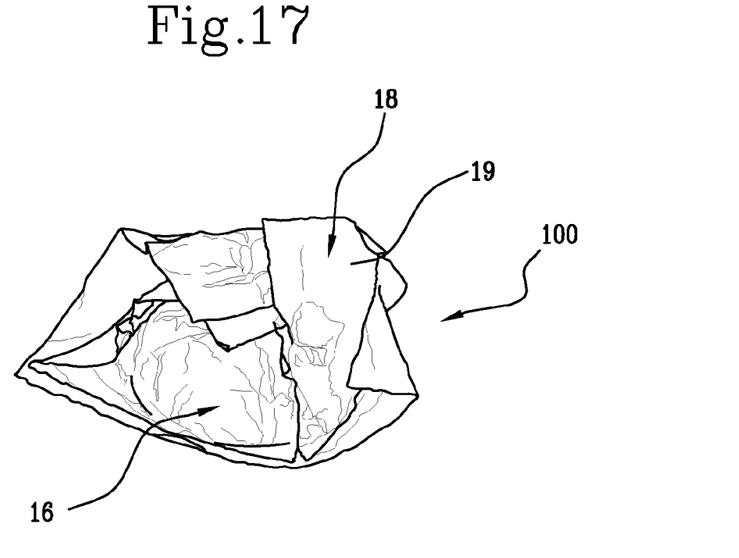
Figure 18:
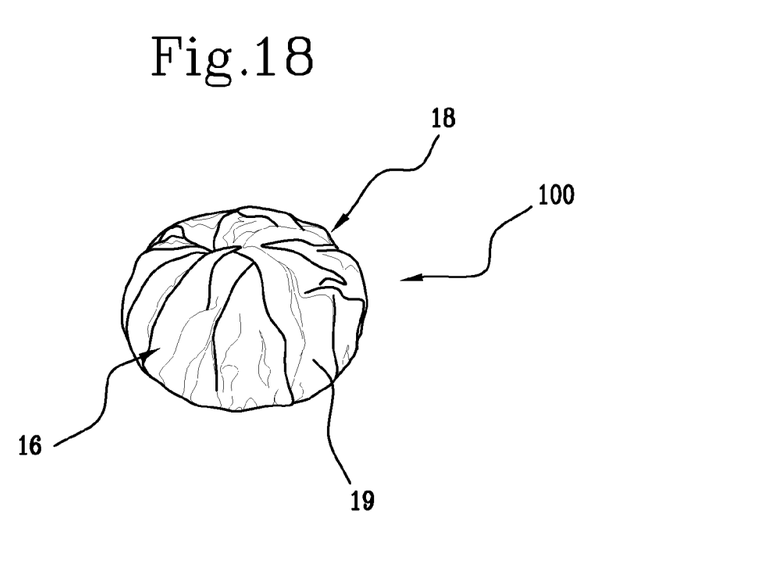

By way of an example, FIG. 13 shows a capsule 100 basically comprising a container 101, for example cup-shaped. The container 101 has a filler mouth 102 and a bottom 103 through which is dispensed the beverage produced during use of the capsule 100 by effect of the infusion of the water with an aromatic substance present in the container and not illustrated.

The reference capsules 100 are single-use capsules and further comprise a perforatable lid 104 through which water can be fed and which is applied by sealing. The capsules 100 may also comprise a bottom lining 105, for example a filter element, positioned, in the example illustrated, on the bottom 103 of the container 101.

The container 101 has a free edge 106 defining the mouth 102 on which the lid 104 is applied and sealed.

The lid 104 is made from a web W of flexible material from which a piece Sp of thin flexible material is cut. The shape of the lid may vary in particular as a function of the shape of the container 101 and of the mouth 102. Generally speaking, the lid has the shape of a disc but alternative embodiments are imaginable.

The sealing device 1 comprises a gripping unit 2, for example operating by suction. More specifically, the gripping unit 2 is a suction cup provided with a suction duct 3.

The gripping unit 2 extends and is movable along a longitudinal axis 4 for picking up and holding the piece Sp of film of flexible material used to make the lid 104 of the capsule 100.

The sealing device 1 also comprises a sealing element 5 comprising a rheostat 6 having an annular body 7 and two terminals 8 extending from the annular body 7. The annular body 7 preferably has a planar form, that is to say, it has an upper annular surface 7a and a lower annular surface 7b, both annular in shape and lying in parallel planes.

The gripping unit 2 is disposed coaxially with the annular body 7 of the rheostat 6 and traverses it along the longitudinal axis 4.

FIGS. 4-7 illustrate a possible embodiment of the rheostat 6. The shape of the annular body 7, which, in the example illustrated, is circular, depends on the shape of the lid 104 and of the capsule 100.

The terminals 8 are connectable to a voltage generator capable of generating and maintaining an electrical potential difference ΔV at the ends of the two terminals in such a way as to cause to flow along the rheostat 6 an electric current capable of heating the annular body 7 to a predetermined sealing temperature. The numeral 9 schematically indicates the electrical connections to the voltage generator 10 forming part of the sealing element.

Figure 8:
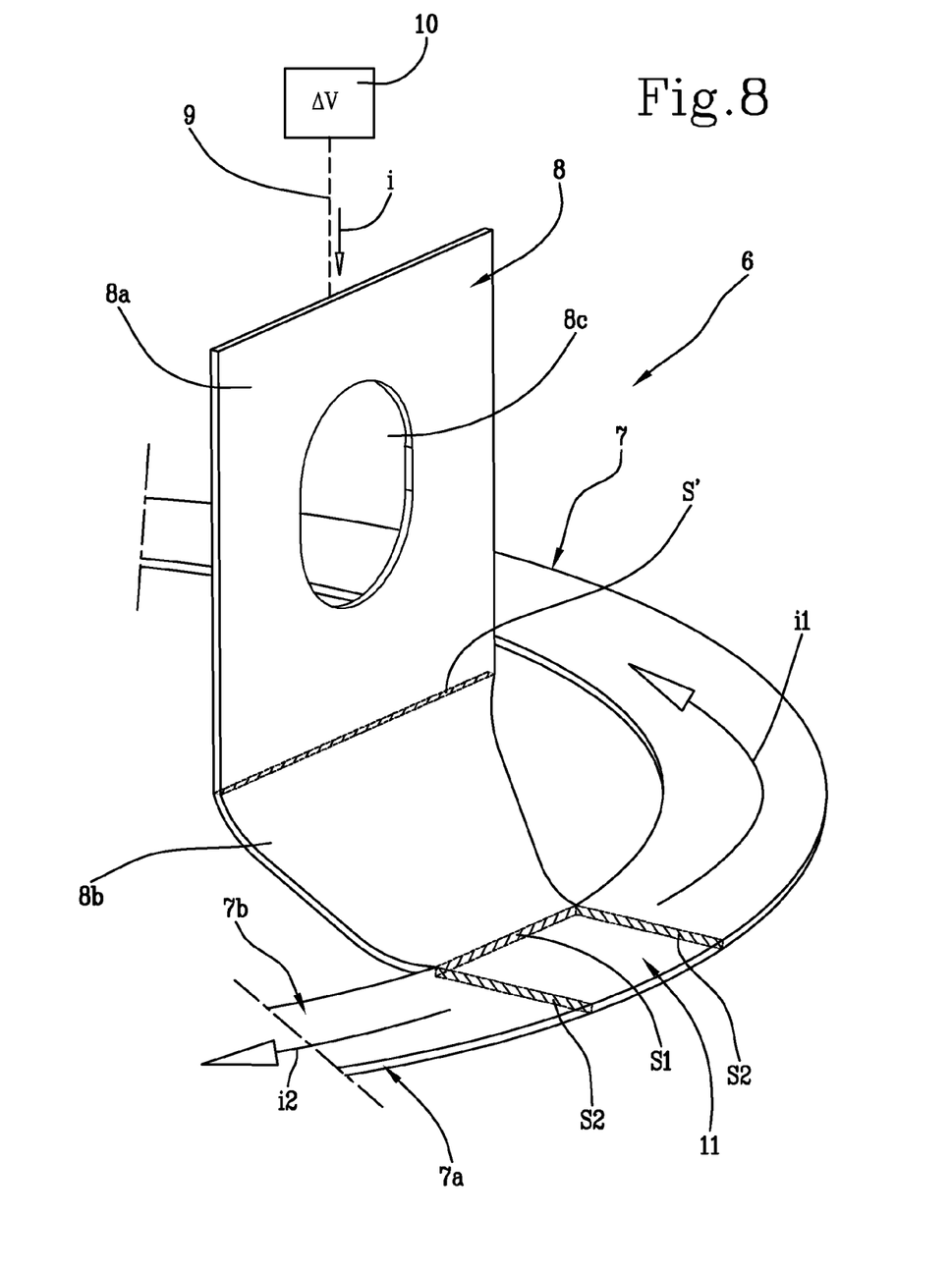
FIG. 8 illustrates the detail A from FIG. 7 in an enlarged, schematic view.

As shown in more detail in FIG. 8, each terminal 8 has at the point of its connection to the annular body 7 of the rheostat 6 a cross section S1 whose surface area is the smallest compared to the cross sections at all other points of the terminal.

It should be noted that the annular body 7 of the rheostat 6 is intended to come into contact with the piece Sp of film positioned with its outer edge in contact with the free outer edge 106 of the mouth 102 of the capsule 100 for a predetermined length of time long enough to seal the piece Sp of film along the edge of the capsule, thereby closing the capsule.

With reference to FIG. 8, the point of contact of each terminal 8 with the annular body 7 of the rheostat 6 defines an electrical node 11 where the current i is divided into two secondary currents i1 and i2 which flow along the annular body 7 and meet at the other terminal. More specifically, FIG. 8 shows a perspective view of a node 11 of the rheostat, highlighting the surfaces S', S1 and S2 which the current flows through.

The surface S' is the surface of a transverse cross section of one of the two terminals of the rheostat. The other terminal and the corresponding node are similar in shape. As is evident from this figure, S1<S'.

The two surfaces S2 are the transverse cross sections of the annular body 7.

At each node 11 the portion of the terminal residing around the cross section S1, whose surface area is the smallest compared to the cross sections at all other points of the terminal, defines a predetermined electrical resistance R1 which is the largest of those measured at any other cross section of the respective terminal.

In effect, as is known, resistance R is the inverse of the electrical conductance G and is defined as follows:

$$R = 1/G = L/\sigma S = \rho L/S$$

where $\sigma$ is the electrical conductivity (whose inverse $\rho$ is the electrical resistivity), L is the distance between the points across which the resistance is measured (hence the length of the rheostat), S is the area of the cross section perpendicular to the direction of the current.

It thus follows that the resistance R' offered by the surface S' to the flow of current i is lower than the resistance R1 offered by the surface S1 and the resistance R2 offered by the surface S2, because the smaller the surface, the higher the resistance.

At the portion of the terminal residing around the cross section S1 whose surface area is the smallest compared to the cross sections at all other points of the terminal, the Joule effect produces a temperature which is higher than that which can be produced at any other point of the terminal.

In effect, increasing the value of the resistance increases the value of the power that can be converted to heat by the Joule effect according to the known relation $P = RI^2$.

The effect of reducing the transverse surface area of the terminals at their points of connection with the annular body 7 allows keeping the annular body 7 of the rheostat at the required sealing temperature without increasing the current i.

Thus, reducing the transverse cross section of the terminals at their points of connection with the annular body 7 increases the heat at the node 11, which contrasts the cooling effect that would occur at the node if the surfaces meeting at the node (that is, the transverse surfaces of the annular body 7 and the transverse surfaces of the terminal 8) were added up. Further, the current i at the node 11 is divided into two currents i1 and i2 which flow to the left and to the right of the surface S1, respectively and which are able to keep the annular body 7 of the rheostat at the required sealing temperature.

This allows preventing excessive cooling at the node, limiting the value of the current i and preventing increases in leakages which are directly proportional to the square of the current i itself.

In addition to the above, it should be noted that in the context of the node 11, the lengths are negligible and thus, the related resistance is directly influenced only by the value of the cross section S1. On the contrary, the length of the annular body 7 is not only not negligible but also greater than the other parts of the rheostat, thus further and significantly increasing the sealing temperature obtainable under the same conditions of current used.

With reference to the figures, the terminals 8 have a straight stretch 8a for mechanical connection to a supporting sleeve 12 and for electrical connection to the voltage generator 10. The straight stretch 8a extends perpendicularly to the planar form of the annular body 7 and is preferably provided with slots 8c for fastening it to the sleeve 12.

Each terminal 8 also has a connecting stretch 8b disposed at an angle to the straight stretch 8a and to the planar form of the annular body 7. Preferably, the cross section S' of the straight stretch 8a is constant, whilst the transverse cross section of the connecting stretch 8b decreases to its minimum value S1 at the point of connection to the annular body 7.

The sleeve 12 defines a through cavity 13 which extends along the longitudinal axis 4 and inside which the gripping unit 2 is coaxially disposed. More specifically, the gripping unit 2 is movable along the longitudinal axis 4 relative to the sleeve 12 by means of movement devices not illustrated. With reference to FIGS. 9-12, the gripping unit 2 is movable inside the sleeve 12 between a raised position, illustrated in FIG. 11, and a lowered position, illustrated in FIG. 10, where it picks up the piece Sp just after it has been cut.

The raised position, as will become clearer as this description continues, corresponds to a sealing position. In other words, the gripping unit 2 is movable along the longitudinal axis 4 relative to the rheostat 6 (attached to the sleeve 12), between a raised position and a lowered position.

The sealing device 1 also comprises a blade 14 disposed coaxially with the gripping unit 2 and with the annular body 7 of the rheostat. More specifically, the blade 14 is tubular and the gripping unit 2 is located inside the blade itself. The blade 14 is designed to cut from the web W of flexible material the piece Sp of film which is to be picked up by the gripping unit 2.

More specifically, the blade 14 is mounted on a support 15 and is movable along the longitudinal axis 4 which thus represents a cutting direction, preferably vertical and at right angles to the web W. The blade is movable between a raised, rest position, illustrated in FIG. 9, and a lowered, cutting position, illustrated in FIG. 10. More specifically, the blade 14 intercepts the web W along its feed path P in the respective lowered position.

Preferably, the support 15 and the sealing element 5 comprising a rheostat 6 move as one along the longitudinal axis 4 during the movement of the cutting blade 14, as described below.

The sealing device 1 according to this invention is applicable to a machine for making capsules 100, not illustrated, comprising for example means for moving the containers along a predetermined path. The machine may also comprise means for moving the web W of flexible material along the predetermined feed path P.

FIGS. 9-12 illustrate the cutting and sealing sequence followed by the sealing device 1 in the machine for making capsules 100.

Figure 9:
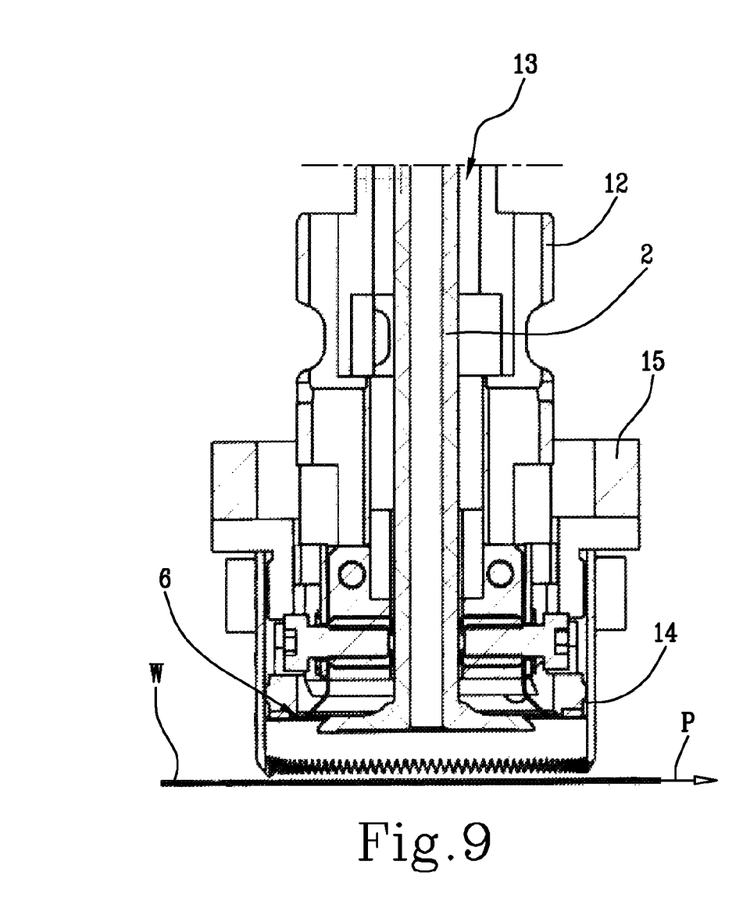
FIGS. 9-12 illustrate the sealing device of FIG. 3 in a sequence of configurations for hermetically sealing a coffee capsule.

During one step in machine operation, the sealing device 1 may be positioned above the web W, as illustrated for example in FIG. 9, where both the gripping unit 2 and the blade 14 are in the raised position.

Figure 10:
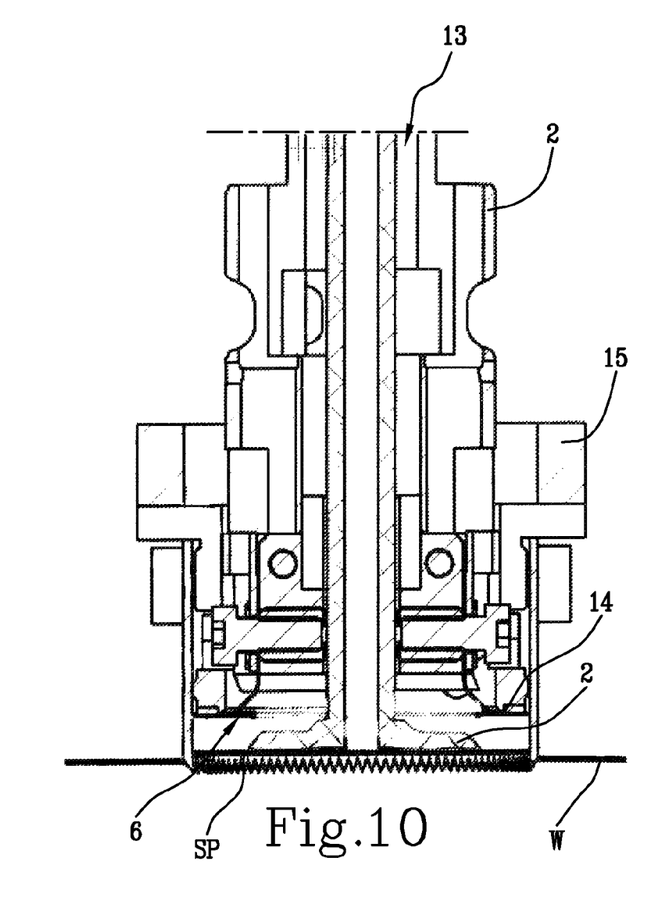

After that, the sealing device 1 may operate at the path P of the web W to cut the piece Sp. This operating step is illustrated for example in FIG. 10, where the blade 14 (together with the support 15) has reached the lowered, cutting position During the cutting step, the web W may be stopped or the sealing device 1 may move along the path P synchronously with the web W. FIG. 10 also shows that when the gripping unit 2 reaches the lowered position, it catches hold of the piece Sp.

The machine may comprise a matrix, not illustrated, acting in conjunction with the blade 14 to give the web W a clean cut.

Figure 11:
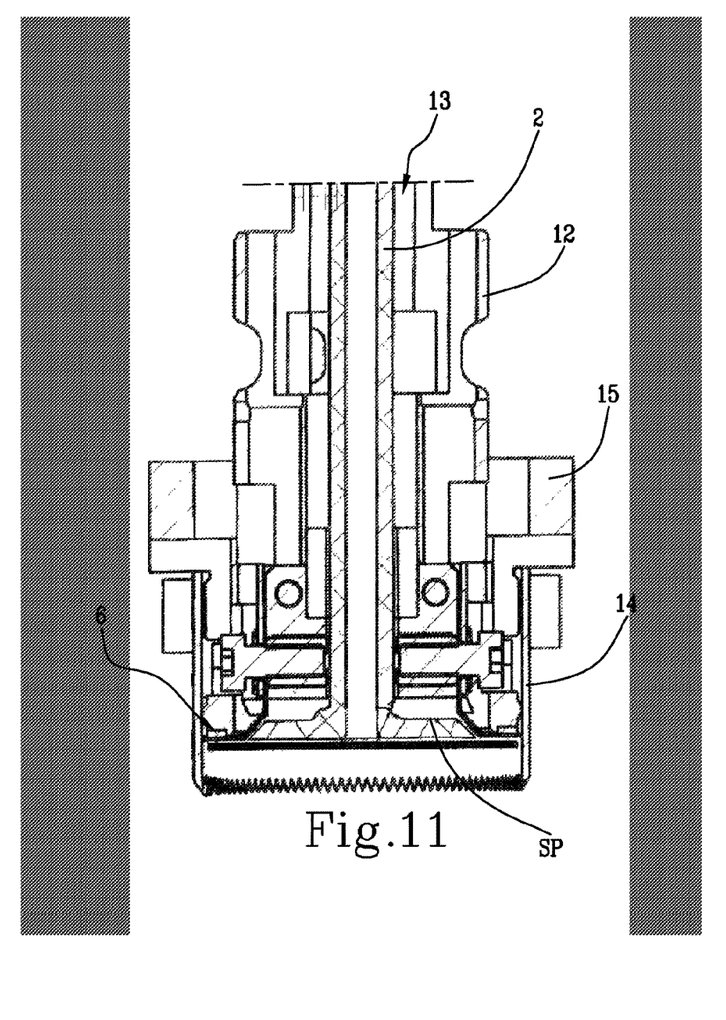

Next, as illustrated for example in FIG. 11, the gripping unit 2 is raised relative to the blade 14 and the rheostat 6 so as to bring the top surface of the piece Sp into contact with the underside surface 7a of the annular body 7.

Figure 12:
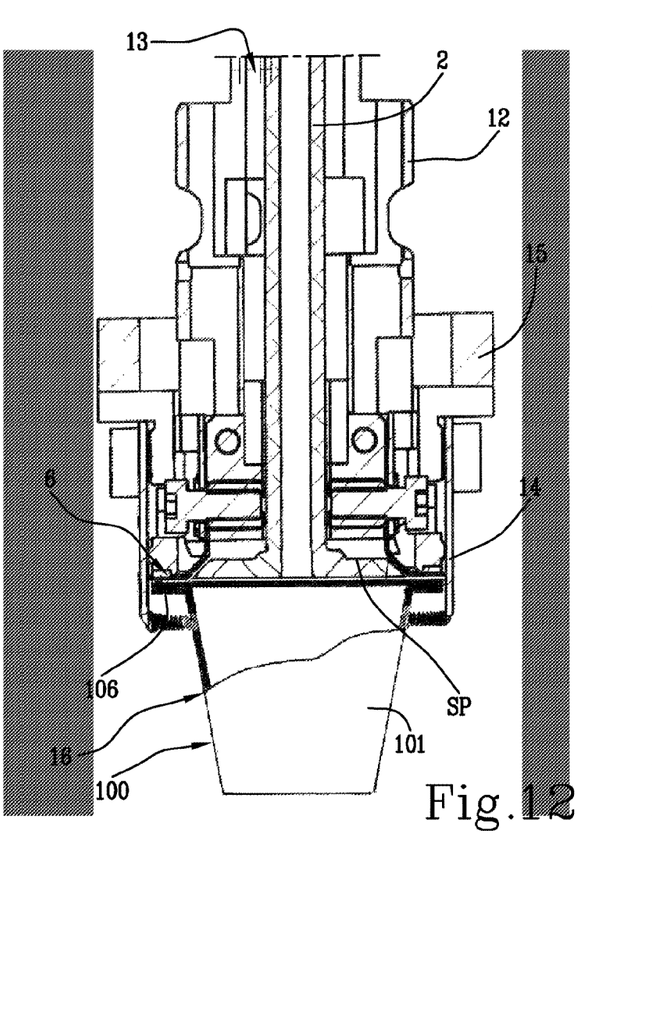

In a subsequent step, illustrated for example in FIG. 12, a container 101 is placed under the sealing device 1 and the underside surface of the piece Sp is placed in contact with the free edge 106 defining the filler mouth 102. This position corresponds to the sealing position illustrated in more detail in FIG. 13.

Advantageously, the sealing device according to this invention is efficient and capable of reconciling the opposite needs to optimize both sealing and electrical efficiency. More specifically, terminals with varying cross sections are used to avoid excessive cooling at the node so as to combine the need to operate at high sealing temperatures on the one hand with the need to limit leakages on the other. Furthermore, the combination of rheostat and blade allows improving machine efficiency because there is no need for intermediate transfers of the pieces of film, which remain associated with the same gripping unit from the moment they are cut to the moment they are sealed.

In FIGS. 14 to 18, the numeral 16 denotes a food product such as, for example, a chocolate, a sweet or a similar product.

The gripping unit 2 is a suction cup 17 for picking up and feeding a piece Sp of thin flexible material forming a film used to cover and at least partly seal a chocolate 16.

The package consists of an envelope 18 wrapped around the chocolate 16.

The envelope comprises a sheet 19 of wrapping material designed to receive, on one of its faces, the chocolate 16.

A plurality of sheets 19 are fed and made to advance on a conveyor belt 20.

The gripping unit 2 places the piece Sp of flexible material over the chocolate 16.

As illustrated in the figure and in exactly the same way as the case of the capsules 100, the annular body 7 of the rheostat 6 is designed to come into contact with the piece Sp of film which, with the edge of it around the product 16, is in contact with the face of the sheet 19 on which the chocolate 16 is positioned.

The foregoing description of all the features of the sealing element 5 provided with the rheostat 6 whose annular body 7 is connectable to the voltage generator 10 also applies to the embodiment illustrated in FIGS. 14 to 18.

The annular body 7 is thus provided with the two terminals 8 which, when connected to the same voltage generator 10, enable the latter to generate and maintain an electrical potential difference at the ends of the two terminals 8 in such a way as to cause to flow along the rheostat 6 an electric current capable of heating the annular body 7 to a predetermined sealing temperature.

The annular body 7 of the rheostat 6 is intended to come into contact with the piece Sp of film positioned in contact with a predetermined portion of the package—in practice along the edge surrounding the chocolate 16—for a predetermined length of time long enough to seal the piece Sp of film to the sheet 19 in such a way as to hermetically seal the product between the package—that is, the sheet 19—and the piece Sp of film.

Once the piece Sp is hermetically sealed around and encloses the chocolate 16 within it, the sheet 19 is folded around the group consisting of the chocolate and the piece Sp in such a way as to obtain an envelope 18 which constitutes the package 100.

It should be noted that the annular body 7 of the rheostat 6 may have different internal diameters so that it can be placed around the food product 16 without touching or damaging it during the sealing operations described above.

It is also evident that the annular body 7 may have different shapes such as, for example, triangular, rectangular or square.

The invention claimed is:

1. A hermetic sealing device for packages containing food products, comprising:
    a unit for gripping and/or feeding a piece of thin flexible material forming a piece of film used to cover and at least partly seal a food product in a package;
    a sealing element comprising a rheostat including an annular body and two terminals extending from the annular body and connectable to a voltage generator capable of generating and maintaining an electrical potential difference at the ends of the two terminals to cause a flow along the rheostat of an electric current capable of heating the annular body to a predetermined sealing temperature;
    each terminal including at a point of contact connection to the annular body of the rheostat, a first cross section having a surface area which is smallest as compared to all other cross sections of the terminal;
    the annular body configured to come into contact with the piece of film positioned in contact with a predetermined portion of the package for a predetermined length of time long enough to seal the piece of film along the package to hermetically seal the food product between the package and the piece of film;
    wherein, at the point of contact connection of each terminal with the annular body of the rheostat, an electrical node is defined where the electric current is divided into two secondary currents which flow along the annular body and meet at the other terminal;
    wherein, at each electrical node, a portion of the terminal residing around the first cross section defines a predetermined electrical resistance which is largest as compared to the all other cross sections of the terminal.

2. The hermetic sealing device according to claim 1, and further comprising:
    wherein the package is a cup-shaped capsule for containing an aromatic substance for infusion, the capsule having a free edge defining a filler mouth and the piece of film being configured to make a lid of the capsule;
    wherein the annular body of the rheostat is configured to contact the piece of film positioned with an outer edge in contact with the free edge to seal the piece of film along the free edge, thereby closing the capsule.

3. The hermetic sealing device according to claim 1, and further comprising:
    wherein the package is an individual wrapper, with each wrapper comprising a sheet of wrapping material including a face, the wrapper configured to receive the food product on the face and to be wrapped around the food product;
    wherein the piece of film is configured to cover and seal the food product on the sheet of wrapping material;
    wherein the annular body is shaped such that the food product covered with the piece of film can pass through the rheostat, the rheostat being configured to surround a full length of a base of the food product and come into contact with the piece of film placed in contact with the sheet of wrapping material for sealing the piece of film onto the sheet of wrapping material.

4. The device according to claim 1, and further comprising a blade mounted coaxially with the unit for gripping and/or feeding and with the annular body, the blade being configured to cut from a web of the flexible material the piece of film which is to be picked up by the unit for gripping and/or feeding.

5. The hermetic sealing device according to claim 1, wherein at the portion of the terminal residing around the first cross section, a Joule effect produces a temperature which is higher than that which can be produced at any other point of the terminal.

\* \* \* \* \*